UNITED STATES PATENT OFFICE.

SAMUEL ARCHIBALD VASEY, OF BROMLEY, ENGLAND.

PRODUCTION OF SOLUBLE PROTEIN FROM INSOLUBLE PROTEIN MATTER.

1,015,857.  Specification of Letters Patent.  Patented Jan. 30, 1912.

No Drawing.   Application filed September 3, 1910.  Serial No. 580,456.

*To all whom it may concern:*

Be it known that I, SAMUEL ARCHIBALD VASEY, a subject of the King of Great Britain, and a resident of Beechcroft, Burnt Ash Lane, Bromley, in the county of Kent, England, have invented certain new and useful Improvements in Processes for the Production of a Soluble Protein or Albumen from Insoluble Protein Matter, of which the following is a specification.

This invention relates to processes for the production of a protein or albumen which shall be soluble in water from cheap protein matter such as meat fiber, meat meal, meat residues, meat albumen, fish albumen or fiber, milk protein, egg albumen, vegetable albumen, and so forth.

In particular the invention relates to processes for the production of such a substance from meat fiber which is cheap and easily procured, being practically a by-product obtained in the manufacture of certain so-called meat extracts.

In the subsequent description "soluble" and "insoluble" are used with reference to water as the proposed solvent.

Briefly, the salient points of my invention comprise the solution of the dry insoluble protein matter in alkali, and the subsequent conversion—without any intermediate digesting step—of the surplus of alkali into phosphorus salts or other harmless salts by treatment with one or more of the oxyacids or acid salts of phosphorus or other acids of a like nature.

There are slight divergencies in the way the original protein matter is treated according as to whether it is fat-free or fat containing and whether in the latter case the fat is removed before the treatment with alkali or is allowed to remain in.

I will now proceed to describe the preparation of the soluble protein or albumen.

In preparing the soluble protein, I take about half a pound of finely powdered dry meat fiber (or any dry insoluble protein matter). If this contains any fat it can be removed at this stage by degreasing or degelatinizing with a warm weak 1% ammonia solution or by other known means. I now add a weak solution of caustic soda or caustic potash or equivalent proportions of materials which react and produce caustic soda or potash e. g. a mixture of carbonate of soda or potash and lime; the most convenient strength of alkali is about 0.25% or even weaker, and about two gallons is added to half a pound of the protein matter.

The proportion of protein matter may vary according to the nature of the protein or substance to be treated. If I employ fresh meat the quantity would be four times as much as that given above, since it contains 75% of moisture. The whole is boiled under extra pressure or at the ordinary atmospheric pressure until a comparatively clear or somewhat milky fluid is obtained. This clearness or milkiness will depend on the comparative absence or presence of fat in the matter, and this may now be removed if not already done; to remove, slaked lime or other clarifying agent should be added when clarification is indicated, in sufficient quantities to saturate the solution.

Instead of lime, I may employ certain other salts of the alkali earth metals, namely strontia or regulated quantities of a soluble salt of calcium, such as calcium chlorid acetate, or nitrate. The solution is then boiled, and decanted filtered or screened, and subsequently cooled. The cleared fluid now obtained is treated for the removal of the calcium or other clarifying agent which is converted into an insoluble salt. The calcium is treated as follows:—A stream of carbonic acid gas is passed through until the fluid just ceases to give a red color with the reagent phenol-phthalein, until in fact the caustic alkali is converted into carbonate.

Instead of carbonic acid gas I may employ carbonate of ammonia in such quantities as to convert the caustic alkali completely into carbonate; the fluid is decanted or otherwise cleared, and cooled. Then a solution of phosphoric acid or soluble acid phosphate of calcium (*e. g.* prepared by the solution of bone ash or calcium phosphate in a 10% solution of phosphoric acid or of both together) is added to the more or less clear, cold fluid, and the whole is then boiled.

It is found that a large proportion of the alkali (estimated at 90%) combines with the protein matter to form albuminates so that the remaining proportion (which may be called free or "surplus" alkali) requiring conversion into phosphates, by the addition of the phosphoric acid is comparatively small. I may substitute any other acid or acid salt (*e. g.* other oxyacids or acid salts of phosphorus, or sulfuric, citric, tartaric, or malic acids) which forms a more or less insoluble salt with calcium or a mixture or compound of these. The turbid mixture is then brought to the boil, when the fluid rapidly clears and a deposit quickly settles, and is, after a time, filtered. The result is a clear sherry colored fluid, containing practically the whole of the original insoluble protein present in the substance used, but in the soluble state.

The liquid can be reduced to a solid by evaporation or other means, the resulting residue being ground to a powder by a suitable method. The powder is readily soluble in cold water to a clear solution.

Where calcium is introduced in the form of acid calcium phosphate, or calcium phosphate dissolved in phosphoric acid, I have found that this is sufficient—preferably with the aid of ammonium carbonate or ammonium hydrate—to effect the clarification of the fluid whether the fat in the original protein matter is removed before the treatment with alkali as described above, or whether it is left in. According to this modification, after the solution in alkali, the mixture is treated with phosphoric acid containing phosphate of calcium, or with a solution of acid calcium phosphate. This is added until the solution is neutral to phenol-phthalein, then an equivalent quantity of ammonium carbonate or ammonium hydrate is added, said solution is then boiled and filtered from the precipitate formed, and the final soluble powder can then be obtained. The addition of ammonium carbonate or hydrate is made to assist in the throwing down of the precipitate which insures the clarification of the liquid.

The processes above described may be modified in various ways.

I claim:

1. In the process for the preparation of a soluble protein from insoluble protein matter, the steps which comprise dissolving the said protein matter in caustic alkali and subsequently converting any surplus of alkali into phosphates by treatment with a suitable phosphorous compound having an acid reaction, the whole substantially as described.

2. In the process for the preparation of a soluble protein from insoluble protein matter, the steps which comprise dissolving the said protein matter in caustic alkali, subsequently converting any surplus of alkali into phosphates by treatment with phosphoric acid containing phosphate of calcium, and then treating the mixture with an ammonium compound, the whole substantially as described.

3. In the process for the preparation of a soluble protein from insoluble protein matter, the steps which comprise dissolving the said protein matter in caustic alkali, subsequently converting any surplus of alkali into phosphates by treatment with phosphoric acid containing phosphate of calcium, and then treating the mixture with ammonium carbonate.

4. In the process for the preparation of a soluble protein from insoluble protein matter, the steps which comprise dissolving the said protein matter in caustic alkali, adding a clarifying agent consisting of a salt of an alkali earth metal, converting the said clarifying agent after it has performed its function into an insoluble salt, and subsequently converting any excess of alkali into phosphates by treatment with phosphoric acid containing phosphate of calcium, the whole substantially as described.

5. In the process for the preparation of a soluble protein from insoluble protein matter, the steps which comprise dissolving the said protein matter in caustic alkali, adding a clarifying agent consisting of a suitable salt of calcium, converting the said agent after it has performed its function into an insoluble carbonate by the addition of a suitable compound, and subsequently converting any surplus of alkali into phosphates by treatment with phosphoric acid containing phosphate of calcium, the whole substantially as described.

6. The process for the preparation of a soluble protein from insoluble fat-containing protein matter, which consists in adding to the latter a suitable quantity of caustic alkali, heating the mixture until as much as possible of the protein matter is dissolved, adding a clarifying agent consisting of a suitable salt of an alkali earth metal in order to clarify the solution and eliminate the fatty matter, removing the solid matter from the mixture, adding carbonic acid gas until the caustic alkali in the liquid is neutralized, then adding phosphoric acid containing phosphate of calcium, and finally removing the remaining solid matter, the whole substantially as described.

SAMUEL ARCHIBALD VASEY.

Witnesses:
ARTHUR H. STANLY,
C. A. HADLEY.